(12) United States Patent
Saur et al.

(10) Patent No.: US 10,768,428 B2
(45) Date of Patent: Sep. 8, 2020

(54) SCREEN FOR AN HMD

(71) Applicant: Carl Zeiss Meditec AG, Jena (DE)

(72) Inventors: Stefan Saur, Aalen (DE); Marco Wilzbach, Stuttgart (DE); Christopher Käsbach, Aalen (DE)

(73) Assignee: CARL ZEISS MEDITEC AG, Jena (DE)

( * ) Notice: Subject to any disclaimer, the term of this patent is extended or adjusted under 35 U.S.C. 154(b) by 0 days.

(21) Appl. No.: 16/133,061

(22) Filed: Sep. 17, 2018

(65) Prior Publication Data

US 2019/0113753 A1 Apr. 18, 2019

(30) Foreign Application Priority Data

Oct. 13, 2017 (DE) .................. 10 2017 123 894

(51) Int. Cl.
| | |
|---|---|
| *G02B 27/01* | (2006.01) |
| *G09F 9/30* | (2006.01) |
| *G02C 7/10* | (2006.01) |
| *G02C 7/12* | (2006.01) |

(52) U.S. Cl.
CPC ......... *G02B 27/0172* (2013.01); *G02B 27/01* (2013.01); *G02B 27/0179* (2013.01); *G09F 9/30* (2013.01); *G02B 2027/0178* (2013.01); *G02B 2027/0187* (2013.01); *G02C 7/104* (2013.01); *G02C 7/12* (2013.01)

(58) Field of Classification Search
CPC .............. G02B 27/017; G02B 27/0172; G02B 2027/0178; G09G 2300/023
See application file for complete search history.

(56) References Cited

U.S. PATENT DOCUMENTS

| | | | |
|---|---|---|---|
| 9,158,115 B1* | 10/2015 | Worley | ................. G02B 30/26 |
| 9,576,398 B1* | 2/2017 | Zehner | ................. G06T 19/006 |
| 2012/0086624 A1 | 4/2012 | Thompson et al. | |
| 2014/0118829 A1* | 5/2014 | Ma | ...................... G02B 5/1885 |
| | | | 359/567 |
| 2015/0173846 A1 | 6/2015 | Schneider et al. | |
| 2015/0323796 A1* | 11/2015 | Yang | ................. G02B 27/0172 |
| | | | 345/690 |

(Continued)

FOREIGN PATENT DOCUMENTS

| | | |
|---|---|---|
| DE | 10335369 | 3/2005 |
| WO | WO-2014-197337 | 12/2014 |

(Continued)

OTHER PUBLICATIONS

German Office Action for 10 2017 123 894.8 dated Jul. 4, 2018.

(Continued)

*Primary Examiner* — Koosha Sharifi-Tafreshi
(74) *Attorney, Agent, or Firm* — Nixon Peabody LLP; Jeffrey L. Costellia

(57) ABSTRACT

A screen (3) for an HMD (1) is provided, and may be designed as a display screen or as a projection screen. The screen (3) comprises a layer (19) of a material with a switchable degree of transparency and at least one further switchable layer (17, 21, 23) which, in dependence on the switching state, can assume at least two physical states, the physical states differently influencing at least one optical property of light passing through the switchable layer or reflected by it.

26 Claims, 3 Drawing Sheets

(56) References Cited

U.S. PATENT DOCUMENTS

| | | | |
|---|---|---|---|
| 2016/0025978 A1* | 1/2016 | Mallinson | G02B 27/0172 |
| | | | 345/8 |
| 2016/0377863 A1 | 12/2016 | Eromäki | |
| 2017/0007351 A1* | 1/2017 | Yu | A61B 90/37 |
| 2017/0210739 A1 | 7/2017 | Luo et al. | |
| 2018/0004013 A1* | 1/2018 | Vasiliev | G02C 7/101 |
| 2018/0246354 A1 | 8/2018 | Popovich et al. | |
| 2018/0261166 A1* | 9/2018 | Seibert | G02B 27/0172 |

FOREIGN PATENT DOCUMENTS

| | | |
|---|---|---|
| WO | WO-2016-135434 | 9/2016 |
| WO | WO-2016-142263 | 9/2016 |

OTHER PUBLICATIONS

U.S. Appl. No. 15/957,291, filed Apr. 19, 2018, Inventor Name: Stefan Saur et al., "Head-Wearable Presentation Apparatus, Method for Operating the Same, and Medical-Optical Observation System".

\* cited by examiner

SCREEN FOR AN HMD

The present invention relates to a screen for a Head Mounted Display, that is to say a display to be mounted on the head, referred to hereinafter as HMD. In addition, the invention also relates to an HMD, in particular an HMD for use in surgery.

The microsurgery market is currently undergoing a digitization transformation. Driven by ergonomic advantages and the possibility of electronic image improvement and/or image enhancement and also newer digital intraoperative imaging methods, digital images are increasingly being used during an operation, in order to provide additional information to the surgeon performing the operation. For example, in surgical applications, for instance in microsurgery, surgical microscopes that allow additional digital information to be superposed on the images obtained from the operating site are in use today. Thus, for example, fluorescence images, digital images obtained from preoperative imaging processes, navigational data, etc., can be superposed on the images of the operating site. There are, however, also surgical applications that do not require the use of a surgical microscope. Examples of such applications are spinal operations or intraoperative radiotherapy applications in the breast, prostate or other areas of the body. In such cases, 2D or 3D monitors are increasingly being used as primary image sources for surgeons. 2D or 3D monitors can also be used to supplement surgical microscopes, for example to make the additional digital information available to medical personnel not using the surgical microscope.

However, the use of monitors as image sources, in particular as primary image sources, also has disadvantages, such as for example in the form of distance-dependent impressions of depth, viewing-angle-dependent reproductions of color, great surface-area requirements in the operating theater, cables representing a trip hazard and challenges in terms of hygiene with respect to cleaning, etc. Therefore, the trend is toward using HMDs instead of monitors for displaying digital image contents. A distinction should be made here between HMDs designed as Augmented Reality Systems (AR systems, occasionally also known as Mixed Reality Systems) and HMDs designed as Virtual Reality Systems (VR systems). AR systems project a digital image into the field of view of the user while the user continues to perceive his surroundings. The projected image in this case appears to manifest itself in the surroundings of the user. In the case of a VR system, on the other hand, the user is completely closed off from the surroundings and only views the digital image content displayed in the HMD. The user is therefore completely immersed in the virtual space. In the case of a VR system, there is no possibility of seeing the surroundings in a peripheral region or of changing quickly from the VR surroundings to the real surroundings. In order to perceive the surroundings, the user must therefore remove the VR system. Nevertheless, the immersion such as that offered by VR systems may be desired in some situations, for example whenever the user should, or would like to, concentrate fully on the digital image contents without being disturbed by impressions from the surroundings.

The present HMDs can already display AR contents. Other systems are only capable of displaying purely VR contents. Systems that are capable of displaying both AR contents and VR contents are described for example in US 2012/0086624 A1 and in US 2016/0377863 A1.

US 2012/0086624 A1 describes an HMD similar to glasses, in which the lenses of the glasses are designed as screens with switchable variable transparency.

US 2016/0377863 A1 describes an HMD in the form of a reflective visor. The visor is formed by a screen with a reflective surface. An image displayed on a display arranged over the visor is reflected by the reflective surface of the visor in the direction of one eye or both eyes of the user of the HMD. The reflectivity or transparency of the visor can in this case be varied.

Although the HMDs described in US 2012/0086624 A1 and in US 2016/0377863 A1 allow switching over between AR and VR, they do not exhaust the possibilities that HMDs offer.

With respect to the prior art described, the object of the present invention is to provide an advantageous screen for an HMD that extends the area of use of an HMD and in particular is advantageous for use in surgery.

In addition, the object of the present invention is to provide an HMD with enhanced functions, which in particular is also suitable for use in surgery.

The first object is achieved by a screen for an HMD as claimed in claim 1, the second object by an HMD as claimed in claim 10. The dependent claims contain advantageous embodiments of the invention.

A screen according to the invention for an HMD comprises a layer of a material with a switchable degree of transparency, which allows flexible switching back and forth between AR, VR and viewing of the surrounding area without additional information. According to the invention, the screen also has at least one further switchable layer, which, in dependence on the switching state, can assume at least two physical states. These physical states influence at least one optical property of light passing through the switchable layer or reflected by it. The at least one optical property that is differently influenced by the physical states of the at least one switchable layer may in this case be for example the wavelength of the light, the polarization of the light or the form of the wavefront of the light.

In an advantageous embodiment of the screen according to the invention, the at least one further switchable layer comprises pixels and can be switched at the pixel level. In this way, the optical property that is influenced by the physical states of the at least one further switchable layer can be influenced at the pixel level, which allows the optical property to be differently influenced in different regions of the screen.

The at least one further switchable layer of the screen not only allows switching back and forth between AR, VR and the undisturbed viewing of the surroundings, but also allows the perception of the surroundings and/or the electronic image to be manipulated. If, for example, the optical property that is differently influenced by the physical states is the wavelength, there is the possibility of partially or completely blocking certain wavelengths depending on the physical state. The layer may in particular comprise a number of sub-layers, which in each case at least partially block different wavelengths. If the influenced optical property is the wavelength, the screen may be used as a spectral filter, which for example in applications involving fluorescence makes it possible for that wave range in which the fluorescence takes place to be allowed to pass and that wavelength range in which the fluorescence is excited to be blocked. Other spectral filter applications are likewise conceivable. If the optical property influenced by the physical states is the polarization of the light, there is the possibility of minimizing reflections in the surrounding image by suitable switching of the state of polarization of the layer. If the optical property influenced by the physical states is the form of the wavefront of the light, it is thereby possible also in the case of a screen worn just in front of the eye to arrange a transparent display in the screen itself. Coming into consideration here as transparent displays are, in particular, transparent LCD displays and transparent OLED displays. The switchable further layer manipulating the wavefront in this case serves the purpose of assuming the imaging function. Moreover, the transparent display may in this case also form the layer of a material with a switchable degree of transparency, for example if a display is used on the basis of LCD shutter technology.

In the case of at least one further switchable layer comprising pixels, there is in particular the possibility that each pixel of the at least one further switchable layer is assigned in position and size to a pixel of a display, for example of the transparent display, or a number of contiguous pixels of a display, for example of the transparent display. Such a layer allows for example the image to be made viewable for a viewer if the screen contains a transparent display and is positioned at a small distance from the eye. Moreover, separation of the image contents for the left eye and the right eye is also possible. This makes it possible to dispense with the imaging optics that are used today in HMDs, which on the one hand reduces the weight of the HMD and on the other hand allows good contrasts, even in surroundings with high light intensity.

Moreover, there is also the possibility that the layer of the material with the switchable degree of transparency comprises pixels and the degree of transparency is switchable at the pixel level. This makes it possible to block out selected regions of the surroundings, for example in order to simulate the view into an eyepiece, to assist concentrating the view on a certain spatial region, to darken or block out disturbing light sources lying in the field of view, etc.

An HMD according to the invention comprises at least one screen according to the invention and a head mounting device for mounting the screen on the head of a user of the HMD. In addition, the HMD according to the invention comprises a device for producing an image on the screen. This device may be for example the layer forming a transparent display that is described with reference to the screen according to the invention. However, there is also the possibility that the device for producing an image on the screen is formed by a display arranged away from the screen in combination with a projector, which projects an image displayed on the display onto the screen serving in this case as a projection screen.

In particular if, depending on the physical state, the at least one further switchable layer of the screen at least partially blocks a certain wavelength, the HMD may be equipped with a light source which emits excitation light with an excitation wavelength range that causes the excitation of a fluorescence in a fluorescing substance in a fluorescence wavelength range. The at least one further switchable layer of the screen is then designed such that in one physical state it blocks the excitation wavelength range and allows the fluorescence wavelength range to pass. In a development, it may also attenuate or block light outside the excitation wavelength range and the fluorescence wavelength range in order to increase the visibility of the fluorescence. In order to achieve this, the further switchable layer, which depending on the physical state at least partially blocks certain wavelengths, may comprise a number of sub-layers, which in each case at least partially block different wavelengths. Such an HMD is suitable for fluorescence applications, for example in the area of surgery, in order to distinguish malignant tissue from healthy tissue. This generally involves injecting a fluorescent dye, which is deposited in the malignant tissue and therefore leads to a fluorescence of the malignant tissue.

The HMD may also comprise an indicator device, which indicates to the surroundings in which switching state the layer of the material with the switchable degree of transparency and/or the at least one further switchable layer is or are. The people working with the person wearing the HMD can infer from the switching state whether the person wearing the HMD is in a phase of concentration, and therefore should not be spoken to as far as possible, or whether the person is not in a phase of concentration, and can therefore be spoken to without any problem. A phase of concentration can be assumed for example if the layer that is switchable in its degree of transparency is switchable at the pixel level and has been switched such that only a certain region of the surroundings is visible for the person wearing the HMD or if the person wearing the HMD is in the virtual space. Moreover, the knowledge of the switching state of the layer that is switchable in its degree of transparency can indicate to the surroundings of the person wearing the HMD whether this person can perceive his surroundings or whether he cannot perceive the surroundings, for example because of immersion in the virtual space.

In the HMD according to the invention, the at least one screen may be designed as a visor, in particular as a surgical visor. Alternatively, the HMD may be designed as smart glasses. In this case, the head mounting device is a glasses frame and the at least one screen is a glasses lens. It goes without saying that in this case both glasses lenses may also be designed as a screen according to the invention.

Further features, properties and advantages of the present invention will become apparent from the following description of exemplary embodiments with reference to the accompanying figures.

A first exemplary embodiment of an HMD, which comprises a screen according to the invention, is described below with reference to FIG. 1.

Figure 1:
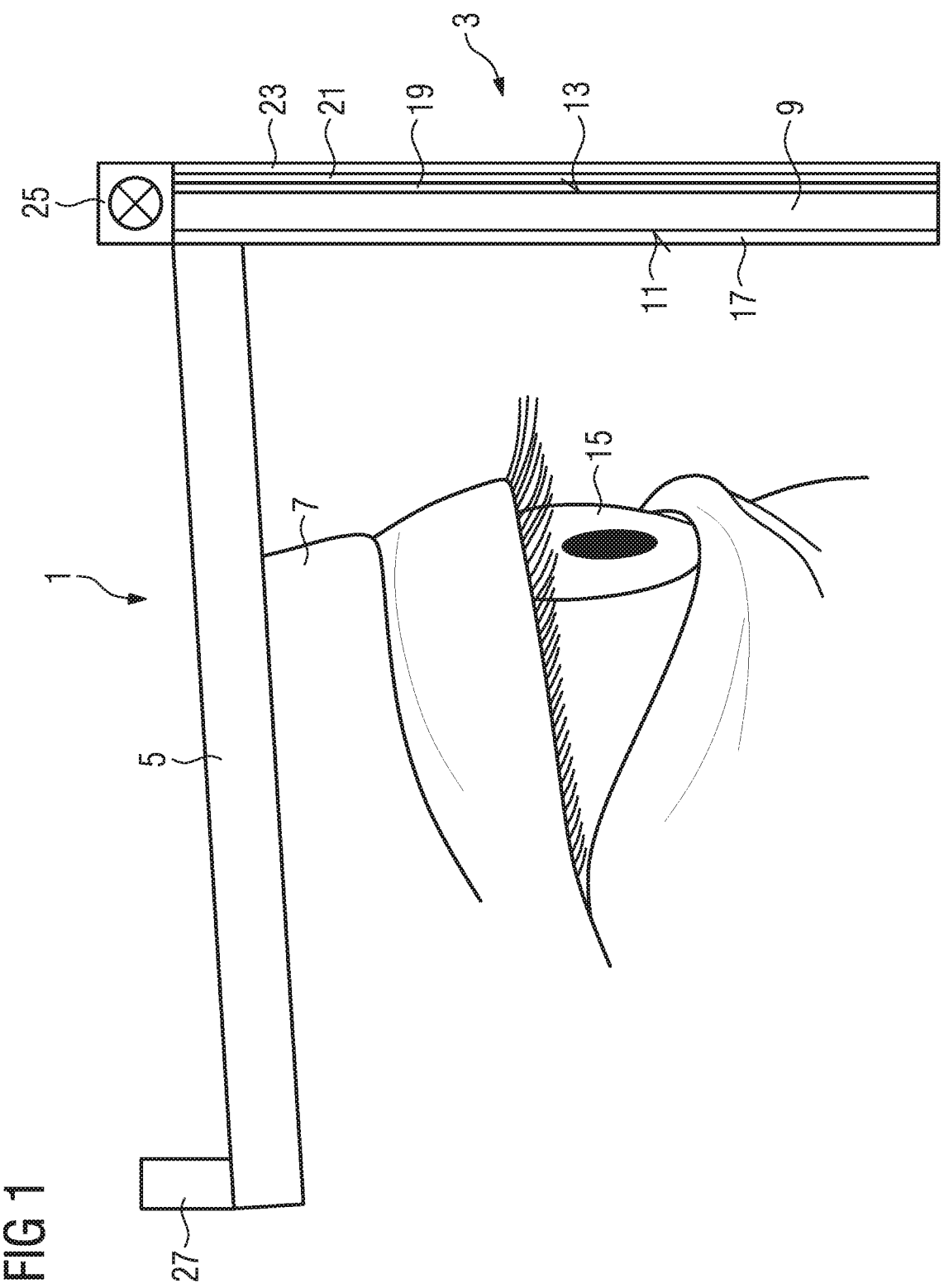
FIG. 1 shows an HMD with a display screen, which comprises a layer of a material with a switchable degree of transparency and at least one further switchable layer.

The HMD 1 shown in FIG. 1 comprises a screen, in the present exemplary embodiment a display screen 3, which is made up of a number of layers. A head mounting device 5 of the HMD 1 that is connected to the display screen 3 allows the HMD 1 to be worn on the head 7. In the simplest case, the head mounting device 5 may be a band to be fitted around the head 7 of a user. However, an embodiment of the head mounting device 5 in the form of a cap or a helmet is also possible. In addition, there is the possibility of designing the head mounting device in the form of side pieces, which run along the head 7 in the manner of glasses earpieces.

In the present exemplary embodiment, the display screen 3 comprises five layers, including a transparent display layer 9, which at the same time forms the substrate for the other layers. In the present exemplary embodiment, the transparent display layer 9 is designed as a transparent OLED display (OLED stands for organic LED), but it may also be designed as a transparent LCD display (transparent liquid crystal display).

The display layer 9 has an inner surface 11, facing the eye 15 of the viewer during use of the HMD 1, and an outer surface 13, facing away from the eye 15 of the viewer. Applied to the inner surface 11 is a switchable layer 17, which has at least two switching states, in which it has different physical states, different physical states of the layer 17 differently influencing the wavefront of the light passing through this layer 17. There is thus one switching state in which the layer 17 allows the wavefront to pass unchanged and another switching state in which a defocusing is introduced into the wavefront of the light emanating from the display layer 9. This allows for example divergent beams of rays emanating from field points of the display layer 9 to be collimated. The viewer 15 can then view the image represented by the collimated beams of rays with a relaxed eye. If the user of the HMD is not viewing an image displayed on the display layer 9, but is viewing the surroundings through the display screen 3, the switchable layer 17 is put into a switching state in which it does not change the wavefront of the light passing through it. In this way, an undisturbed view is possible. The switchable layer 17 therefore serves as a switchable optic layer.

In the present exemplary embodiment, the switchable layer 17 (switchable optic layer) is made up of pixels which are individually switchable. In this way, different regions of the layer 17 can be put into different switching states, so that some regions of the layer 17 manipulate the wavefront and other regions of the layer 17 allow the wavefront to pass unchanged. In this way it is possible to view an image presented on the display layer 9 in one region of the display screen 17, while the surroundings can be viewed undisturbed through other regions of the display screen 3. There is also the possibility of switching pixels of the switchable layer 17 differently in spatial alternation, so as to create a checkerboard pattern made up of pixels, pixels that are in a switching state that manipulates the wavefront alternating with pixels that are in a state that does not manipulate the wavefront. In the present exemplary embodiment, those of the pixels arranged in the manner of a checkboard that manipulate the wavefront are switched such that beams of rays emanating from pixels of the display layer 9 are collimated. The user then perceives the image presented on the display layer 9 through those pixels that collimate the beams of rays and perceives the surroundings through the other pixels. In this way, the user can be presented a transparent image which is superposed on the surroundings, it being possible for the surroundings to be viewed undisturbed to a large extent. This works all the better the smaller the pixels of the display layer 9 and the switchable layer 17 are. In particular if the pixels are so small that the eye 15 cannot resolve them, a very good visual impression can be achieved.

The switchable optic layer may be in particular a dielectric metasurface with spatial multiplexing, as described for example in US 2017/0219739 A1. With regard to the structure of such an electrical metalayer, reference is made to the statements made in this document.

On the outer surface 13 of the display layer 9 there is a layer 19 of a material with a switchable degree of transparency. This layer 19 has at least two switching states, in which it has different physical states, the layer 19 in the present exemplary embodiment being completely transparent in one physical state and completely opaque in the other physical state. If the layer 19 is completely transparent, it allows viewing of the surroundings or viewing of an image superposed on the surroundings, which is displayed on the display layer 9, so that the HMD can serve as an AR display. If, on the other hand, the layer 19 with the switchable degree of transparency is completely opaque, only the image presented on the display layer 9 can be perceived, but no longer the surroundings, so that the HMD can serve as a VR display. If the layer 19 with the switchable degree of transparency comprises pixels, there is also the possibility of blocking the view of certain regions of the surroundings, for example of those regions in which the user perceives the image displayed on the display layer 9. This may be useful in particular with regard to low-contrast displays, in order to block out any disturbing background light in the region of the image. By zonal switching of the degree of transparency of the layer 19, it is also possible to block the direct view of disturbing light sources. If the layer 19 with the switchable degree of transparency allows a number of transparency stages or can be switched infinitely variably from completely transparent to completely opaque, there is also the possibility of setting the transparency in dependence on the intensity of the surrounding light, in order for example to improve the perceptibility of an image superposed on the surroundings or generally to reduce a disturbing brightness of the surrounding light in the manner of sunglasses. Although the layer 19 of a material with a switchable degree of transparency is represented in the present exemplary embodiment as a layer of its own that has been applied to the display layer 9, it may also be integrated in the display layer 9, for example if the display layer 9 is configured on the basis of LCD shutter technology.

In the present exemplary embodiment, applied to the layer 19 of a material with a switchable degree of transparency is a further switchable layer 21, which has at least two switching states in which it has different physical states. These physical states differently influence the polarization of the light passing through the layer 21. In the present exemplary embodiment, the layer 21 serves as a polarization filter, serving as a polarizer in the one physical state that is dependent on the switching state and not influencing the polarization of the light passing through in the other physical state that is dependent on the switching state. Such an embodiment allows reflections to be minimized by suitable choice of the direction of polarization. This may be advantageous in particular in the case of a medical visor, since, when there are reflections at liquid present at the operating site, a linear polarization of the light reflected by the liquid often occurs. However, there is also the possibility of designing the layer 21 such that it always serves as a polarizer, the physical states associated with the different switching states polarizing the light differently. Thus, the layer 21 may for example serve as a polarizer which linearly polarizes the passing light, and the direction of the linear polarization depends on the switching state and the physical state associated with it. By setting the direction of polarization perpendicularly to the linear polarization of the reflected light, the corresponding reflections can be minimized. Physical states which, instead of polarizing the passing light linearly, polarize it circularly, turning to the left or right, are also possible.

Applied to the layer 21 is a further switchable layer 23, which can be brought into at least two switching states, in which it has different physical states, which act differently on the wavelength of the light passing through the layer 23. In particular, the layer 23 is designed in the present exemplary embodiment such that in the one switching state it allows all wavelengths to pass unattenuated, whereas in another switching state it at least partially blocks at least one wavelength or a wavelength band. In this way, the layer 23 can be used as a switchable spectral filter. The layer 23 may in particular also comprise here a number of sub-layers, which in each case serve as switchable interference filters.

The layer 23 may in particular be used for performing fluorescence observation with the HMD 1. For this purpose, the HMD 1 has a light source 25, which emits excitation light with an excitation wavelength range that causes excitation of a fluorescence in a fluorescing substance. Upon excitation, the fluorescing substance then emits in a fluorescence wavelength range that is different from the excitation wavelength range. The layer 23 for influencing the wavelength of the passing light is in this case designed such that in one switching state it allows all wavelengths to pass, whereas in another switching state it blocks at least the excitation wavelength range. Optionally, it may also be designed such that it not only blocks the excitation wavelength range, but additionally attenuates those wavelength ranges that lie outside the excitation wavelength range and the fluorescence wavelength range, so that even a low-intensity fluorescence is not unnecessarily superposed by the other wavelength ranges.

The HMD also has an indicator device, which in the present exemplary embodiment is designed as an indicator lamp 27. Depending on the switching state of one or more of the individual switchable layers, the indicator lamp lights up either red or green. In particular, the indicator lamp 27 may light up either red or green in dependence on the switching state of the layer 19 of a material with switchable transparency. In the present exemplary embodiment, the indicator lamp 27 lights up red if the layer 19 is completely opaque or completely opaque apart from a small region. In this case it can be assumed that there is complete immersion in the virtual space, or the user is concentrating on a certain point in his field of view, so that the user of the HMD 1 does not perceive the surroundings. Attempts by persons from the surroundings to make contact may then cause irritation, which in particular in the case where the HMD takes the form of a surgical visor can lead to the user being confused or even startled, which is undesired during an operation. If, on the other hand, the layer 19 is switched to completely transparent, the indicator lamp 27 lights up green, which indicates that the wearer of the HMD perceives his surroundings and is in principle prepared for interaction. This is only one example of switching states that lead to the indicator lamp lighting up red or green. Depending on the use of the HMD, other switching states may likewise lead to it lighting up red or green or lighting up in other colors.

Figure 2:
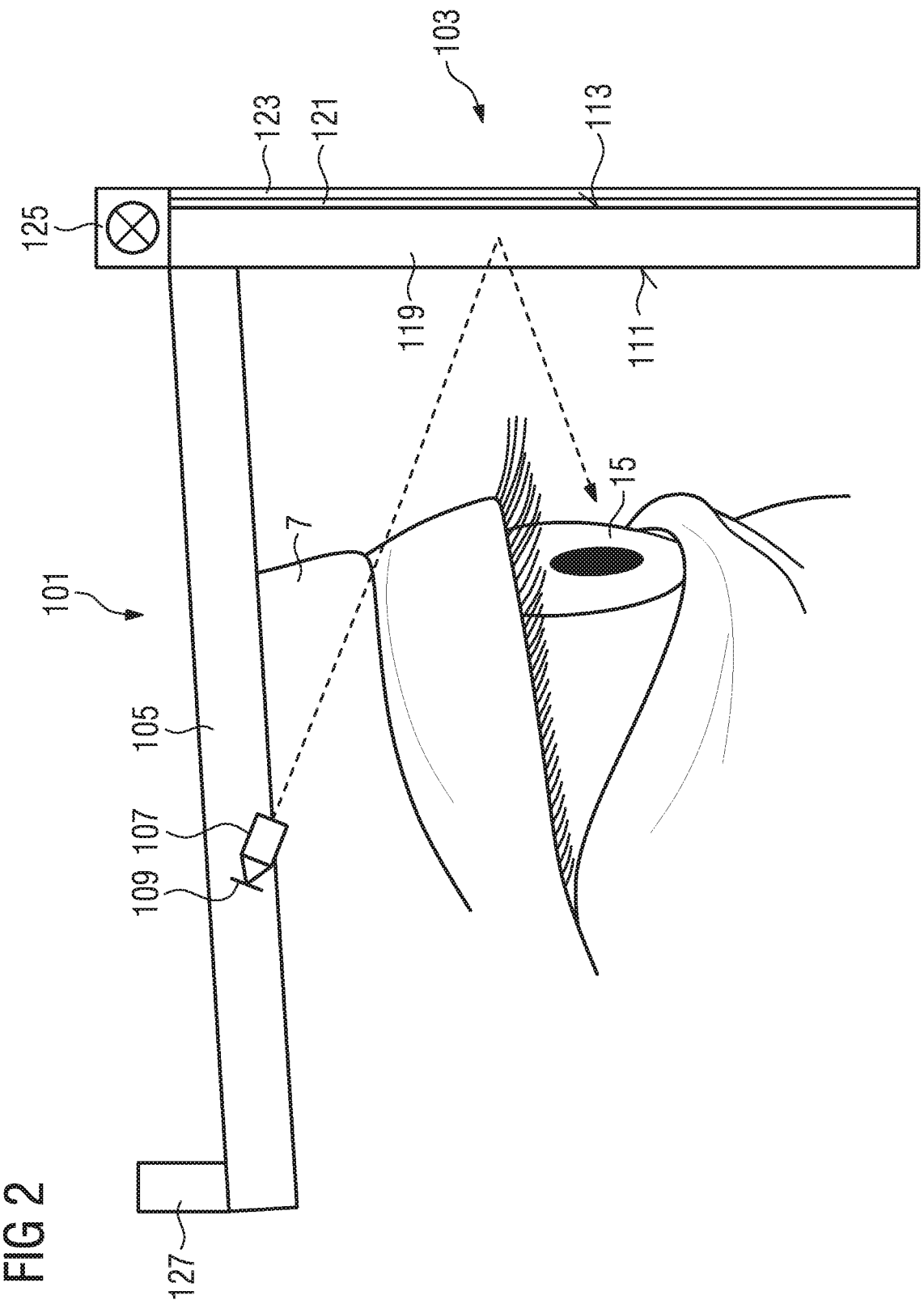
FIG. 2 shows an HMD with a projection screen, which comprises a layer of a material with a switchable degree of transparency and at least one further switchable layer.

A second exemplary embodiment of an HMD with a screen, which comprises a layer of a material with a switchable degree of transparency and at least one further switchable layer, is shown in FIG. 2. In the HMD 101 from FIG. 2, the screen is not designed as a display screen, but as a projection screen 103. As a substrate, the projection screen 103 has a reflective layer 119, the reflectivity or degree of transmission of which is switchable. It has at least two switching states, being completely opaque and reflective in one switching state, whereas it is completely transparent in the other switching state. Reflective is intended here not be understood as meaning reflective in the sense of a mirror, but reflective in the sense of a projection screen that is as far as possible white.

Also in the exemplary embodiment shown in FIG. 2, the HMD 101 is designed as a surgical visor. The head mounting device 105 in this case does not differ from the head mounting device 5 from the first exemplary embodiment, and is therefore not explained once again in order to avoid repetition.

The reflective layer 119 with the switchable degree of transparency has an inner surface 111, facing the eye 15 when the HMD 101 is being worn on the head 7, and an outer surface 113, facing away from the eye 15. The inner surface 111, facing the eye 15, serves as a projection surface for an image displayed on a display 109 and projected onto the projection surface 111 by means of a projector 107. In the present exemplary embodiment, the projector 107 and the display 109 are arranged on the head mounting device 105 in such a way that, when the surgical visor is worn on the head 7, they are located in the region of the temples and the image is projected onto the inner surface 111 from laterally above. Depending on the embodiment, there may be a single display 109 and a single projector 107, or there may be a display 109 and an assigned projector 107 on each side of the surgical visor.

In the present exemplary embodiment, the reflective layer 119 can be switched infinitely variably between completely opaque and reflective and completely transparent. When it is completely opaque, the surgical visor serves as a VR display, and when it is switched to partially transparent it serves as an AR display. If the reflective layer 19 has been switched to completely transparent, the projection screen 103 just serves for viewing the surroundings.

Like the display screen 3 in the first exemplary embodiment, the projection screen 103 may comprise pixels and be switchable in its degree of transparency at the pixel level. As in the first exemplary embodiment, this allows certain regions of the surroundings to be blocked out or superposed. For example, in the case of a surgical application, the upper region of the reflective layer 119 may be switched to opaque, in order to display a digitally improved image of the operating site, while the lower region is switched to transparent, in order to keep certain regions of the surroundings perceptible, for instance in order that the surgeon can find and pick up instruments without any problem. As in the first exemplary embodiment, there is moreover also the possibility of blocking the direct view of certain light sources, in order to avoid glare. What has been said with reference to the setting of the degree of transparency of the layer 19 of the first exemplary embodiment therefore applies correspondingly with reference to the layer 119 of the second exemplary embodiment.

On the outer surface of the layer 119 there is a switchable layer 121 with two switching states, the layer being in a different physical state depending on the switching state. Depending on the physical state, the switchable layer 121 influences the polarization of the light passing through it. This layer corresponds to the polarization-influencing layer 21 from the first exemplary embodiment. Therefore, no further statements are made at this point in relation to the layer 121, and instead reference is made to the statements made with reference to the polarization-influencing layer 21 in the first exemplary embodiment, which apply here analogously.

Applied to the polarization-influencing layer 121 is a wavelength-influencing layer 123. This layer also has an equivalent in the first exemplary embodiment, to be specific the wavelength-influencing layer 23, so that also with respect to the wavelength-influencing layer 123 no further explanations are given at this point, and instead reference is made to the explanations given with reference to the wavelength-influencing layer 23 of the first exemplary embodiment.

The surgical visor of the second exemplary embodiment also has a light source 125 for emitting fluorescence-exciting excitation light. As in the first exemplary embodiment, the light source 125, together with the layer 123 influencing the wavelength of the passing light, allows a fluorescence observation to be performed. Reference is made to the corresponding statements in the first exemplary embodiment.

Furthermore, the surgical visor of the second exemplary embodiment also has an indicator lamp 127, the function and mode of operation of which correspond to the indicator lamp 27 of the first exemplary embodiment. Here, too, instead of further explanation, reference is made to the explanations given with reference to the indicator lamp 27 in the first exemplary embodiment.

Figure 3:
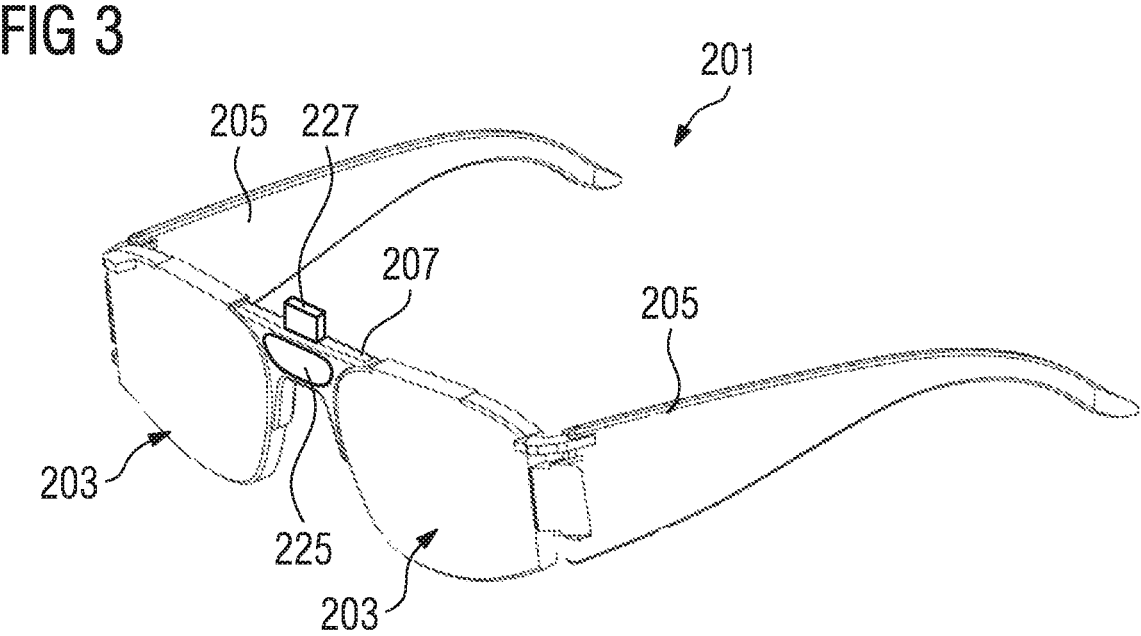
FIG. 3 shows an HMD in the form of glasses, the glasses lenses of which are designed as display screens which comprise a layer of a material with a switchable degree of transparency and at least one further switchable layer.

A third exemplary embodiment of an HMD according to the invention is described below with reference to FIG. 3. In this exemplary embodiment, the HMD is designed as smart glasses 201 instead of as a visor. These glasses comprise a glasses frame 207 with glasses earpieces 205 as a head mounting device. Fitted in the glasses frame 207 are glasses lenses 203, which are designed as display screens 203, which correspond in their structure to the display screen 3 from the first exemplary embodiment. With regard to the structure and the properties of the glasses lenses 203, reference is therefore made to the statements made in the first exemplary embodiment with regard to the display screen 3.

Also arranged in the glasses frame is a light source 225, which is capable of emitting excitation light for exciting a fluorescence. This excitation light source 225 corresponds in structure and function to the excitation light source 25 of the first exemplary embodiment, so that, with regard to the light source 225 and its interaction with the wavelength-influencing layer of the glasses lenses 203, reference is made to the corresponding statements relating to the light source 25 and the wavelength-influencing layer 23 of the display screen 3.

In addition, the smart glasses 201 also have an indicator lamp 227, the structure and function of which are the same as in the previous exemplary embodiments. Therefore, also with regard to the indicator lamp 227, reference is made to the explanations with respect to the indicator lamp 27 in the first exemplary embodiment.

The present invention has been described in detail on the basis of exemplary embodiments for purposes of explanation. However, a person skilled in the art recognizes that individual features of the exemplary embodiments can be omitted or that features of different exemplary embodiments can also be combined with one another. Thus, for example, there is no need necessarily for both the polarization-influencing layer and the wavelength-influencing layer to be present. Similarly, a layer with switchable optics, as represented by the layer 11 in the first exemplary embodiment, may also be disposed upstream of the reflective layer 119 on the inner side. Furthermore, it should be pointed out that the number and size of the pixels of the optic layer may, but does not have to, correspond to the number and size of the pixels of the display. Thus, there is the possibility that for example the pixels of the optic layer are larger than the pixels of the display, so that for a number of display pixels there is in each case a single optic pixel. Moreover, one or more of the other switchable layers may also comprise pixels and be switchable at the pixel level. Furthermore, it is possible that, in the case of a fluorescence application, an external light source for emitting excitation light is used instead of a light source for emitting excitation light that is arranged in or on the HMD. Therefore, the invention is not intended to be defined by the combinations of features that are described in the exemplary embodiments, but only by the combinations of features that are specified in the appended claims.

LIST OF REFERENCE SIGNS

1 HMD
3 Display screen
2 Head mounting device
7 Head
9 Display layer
11 Inner surface
13 Outer surface
15 Eye
17 Switchable optic layer
19 Layer with switchable degree of transparency
21 Polarization-influencing layer
23 Wavelength-influencing layer
25 Light source
27 Indicator lamp
101 HMD
103 Projection screen
105 Head mounting device
107 Projector
109 Display
111 Inner surface
113 Outer surface
119 Reflective layer with switchable degree of transparency
121 Polarization-influencing layer
123 Wavelength-influencing layer
125 Light source
127 Indicator lamp
201 Smart glasses
203 Glasses lens
205 Glasses earpiece
207 Glasses frame
225 Light source
227 Indicator lamp

The invention claimed is:

1. A screen for an HMD comprising:
    a first switchable layer of a material with a switchable degree of transparency; and
    at least one second switchable layer which, in dependence on a switching state, can assume at least two physical states, the at least two physical states differently influencing at least one optical property of light passing through the at least one second switchable layer or reflected by it,
    wherein the at least one optical property that is differently influenced by the at least two physical states of the at least one second switchable layer is a wavelength of the light, and the at least one second switchable layer at least partially blocks certain wavelengths of the light depending on the physical state of the at least two physical states.

2. The screen as claimed in claim 1, wherein the at least one second switchable layer comprises pixels and is switchable at a pixel level.

3. The screen as claimed in claim 1, wherein the at least one second switchable layer comprises a number of sub-layers, which in each case at least partially block different wavelengths.

4. The screen as claimed in claim 1, wherein the at least one optical property that is differently influenced by the at least two physical states of the at least one second switchable layer is a polarization of the light.

5. The screen as claimed in claim 1, wherein the at least one optical property that is differently influenced by the at least two physical states of the at least one second switchable layer is a form of a wavefront of the light.

6. The screen as claimed in claim 1, further comprising a third layer forming a transparent display.

7. The screen as claimed in claim 2, further comprising:
a third layer forming a transparent display;
wherein the transparent display comprises pixels, and each pixel of the at least one second switchable layer is assigned in position and size to a pixel of the transparent display, or a number of contiguous pixels of the transparent display.

8. The screen as claimed in claim 1, wherein the first switchable layer of the material with the switchable degree of transparency comprises pixels and a degree of transparency is switchable at a pixel level.

9. A system comprising:
an HMD with at least one screen as claimed in claim 1,
a mount configured to retain the at least one screen on a head of a user of the HMD, and
a device configured to produce an image on the at least one screen.

10. The system as claimed in claim 9, wherein the device comprises a display arranged away from the at least one screen in combination with a projector, the projector being configured to project an image displayed on the display onto the at least one screen.

11. The system as claimed in claim 9, further comprising:
a light source configured to emit excitation light with an excitation wavelength range that causes excitation of a fluorescence in a fluorescing substance in a fluorescence wavelength range, and the at least one second switchable layer of the at least one screen in one physical state blocks the excitation wavelength range and allows the fluorescence wavelength range to pass.

12. The system as claimed in claim 9, further comprising:
an indicator device configured to indicate a switching state of the first switchable layer of the material with the switchable degree of transparency, the at least one second switchable layer, or a combination thereof.

13. The system as claimed in claim 9, wherein the at least one screen is embodied as a visor.

14. The system as claimed in claim 9, wherein the mount is a glasses frame and the at least one screen is a glasses lens.

15. A screen for an HMD comprising:
a first switchable layer of a material with a switchable degree of transparency;
at least one second switchable layer which, in dependence on a switching state, can assume at least two physical states, the at least two physical states differently influencing at least one optical property of light passing through the at least one second switchable layer or reflected by it; and
a third layer forming a transparent display,
wherein the at least one second switchable layer comprises pixels and is switchable at a pixel level, and the transparent display comprises pixels, and each pixel of the at least one second switchable layer is assigned in position and size to a pixel of the transparent display, or a number of contiguous pixels of the transparent display.

16. The screen as claimed in claim 15, wherein the at least one optical property that is differently influenced by the at least two physical states of the at least one second switchable layer is a wavelength of the light.

17. The screen as claimed in claim 16, wherein the at least one second switchable layer at least partially blocks certain wavelengths of the light depending on the physical state of the at least two physical states, and the at least one second switchable layer comprises a number of sub-layers, which in each case at least partially block different wavelengths.

18. The screen as claimed in claim 15, wherein the at least one optical property that is differently influenced by the at least two physical states of the at least one second switchable layer is a polarization of the light.

19. The screen as claimed in claim 15, wherein the at least one optical property that is differently influenced by the at least two physical states of the at least one second switchable layer is a form of a wavefront of the light.

20. The screen as claimed in claim 15, wherein the first switchable layer of the material with the switchable degree of transparency comprises pixels and a degree of transparency is switchable at a pixel level.

21. A system comprising:
an HMD with at least one screen as claimed in claim 15,
a mount configured to retain the at least one screen on a head of a user of the HMD, and
a device configured to produce an image on the at least one screen.

22. The system as claimed in claim 21, wherein the device comprises a display arranged away from the at least one screen in combination with a projector, the projector being configured to project an image displayed on the display onto the at least one screen.

23. The system as claimed in claim 21, further comprising:
a light source configured to emit excitation light with an excitation wavelength range that causes excitation of a fluorescence in a fluorescing substance in a fluorescence wavelength range, and the at least one second switchable layer of the at least one screen in one physical state blocks the excitation wavelength range and allows the fluorescence wavelength range to pass.

24. The system as claimed in claim 21, further comprising:
an indicator device configured to indicate a switching state of the first switchable layer of the material with the switchable degree of transparency, the at least one second switchable layer, or a combination thereof.

25. The system as claimed in claim 21, wherein the at least one screen is embodied as a visor.

26. The system as claimed in claim 21, wherein the mount is a glasses frame and the at least one screen is a glasses lens.

* * * * *